United States Patent
Lerzer et al.

(10) Patent No.: US 9,232,549 B2
(45) Date of Patent: *Jan. 5, 2016

(54) TECHNIQUE FOR AT COMMAND HANDLING IN RELATION TO AN EPS PACKET DOMAIN

(71) Applicant: TELEFONAKTIEBOLAGET L M ERICSSON (PUBL), Stockholm (SE)

(72) Inventors: Jürgen Lerzer, Neumarkt/Opf (DE); Matthias Grimm, Stein (DE); Reinhold Schneider, Veitsbronn (DE); Michael Hohner, Nuremberg (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/297,750

(22) Filed: Jun. 6, 2014

(65) Prior Publication Data

US 2014/0286310 A1    Sep. 25, 2014

Related U.S. Application Data

(63) Continuation of application No. 13/120,970, filed as application No. PCT/EP2009/005748 on Aug. 7, 2009, now Pat. No. 8,787,311.

(60) Provisional application No. 61/101,016, filed on Sep. 29, 2008.

(51) Int. Cl.
| | |
|---|---|
| *H04W 4/00* | (2009.01) |
| *H04W 76/02* | (2009.01) |
| *H04W 28/02* | (2009.01) |
| *H04W 36/00* | (2009.01) |
| *H04W 88/02* | (2009.01) |

(52) U.S. Cl.
CPC ........ *H04W 76/021* (2013.01); *H04W 28/0252* (2013.01); *H04W 36/0022* (2013.01); *H04W 76/022* (2013.01); *H04W 76/025* (2013.01); *H04W 88/02* (2013.01)

(58) Field of Classification Search
None
See application file for complete search history.

(56) References Cited

U.S. PATENT DOCUMENTS

| | | |
|---|---|---|
| 8,031,741 B2 | 10/2011 | Olvera-Hernandez |
| 8,599,802 B2 | 12/2013 | Sammour et al. |
| 2005/0070290 A1 | 3/2005 | Baggstrom et al. |

(Continued)

FOREIGN PATENT DOCUMENTS

WO    WO 2008020788 A1    2/2008

OTHER PUBLICATIONS

3GPP, Technical Specification Group Services and System Aspects; General Packet Radio Service (GPRS) enhancements for Evolved Universal Terrestrial Radio Access Network (E-UTRAN) access (Release 8), 3GPP TS 23.401 V8.0.0, 2007.

(Continued)

*Primary Examiner* — Michael J Moore, Jr.

(57) ABSTRACT

A method and system of facilitating the use of AT commands specified for a General Packet Radio Service (GPRS) packet domain in relation to an Evolved Packet System (EPS) packet domain is provided. An embodiment of the present invention comprises defining, in response to an AT command directed to the definition of a secondary Packet Data Protocol (PDP) context, an EPS Service Data Flow (SDF) on the basis of the secondary PDP context.

24 Claims, 6 Drawing Sheets

(56) References Cited

U.S. PATENT DOCUMENTS

| | | |
|---|---|---|
| 2008/0025263 A1 | 1/2008 | Pelkonen |
| 2009/0185524 A1 | 7/2009 | Sammour et al. |
| 2009/0239554 A1 | 9/2009 | Sammour et al. |
| 2009/0264097 A1 | 10/2009 | Cai et al. |
| 2010/0246533 A1 | 9/2010 | Lindin et al. |
| 2012/0082095 A1 | 4/2012 | Sun |
| 2013/0054738 A1* | 2/2013 | Borges et al. ............. 709/217 |
| 2014/0128052 A1* | 5/2014 | Aguirre et al. ............. 455/418 |

OTHER PUBLICATIONS

Qualcomm ESG: "Multiple PDP Contexts in UMTS", 2006.
AT Command Reference, release 3.6.1.0, 2006.

\* cited by examiner

600

| Identifiers | GPRS packet domain | EPS packet domain |
|---|---|---|
| Towards the network | NSAPI (identifies PDP contexts) | EPS bearer identity (identifies EPS Bearers) |
| Towards applications | CID (identifies PDP contexts) | CID (identifies Default EPS Bearers or SDFs) |

Fig. 6

TECHNIQUE FOR AT COMMAND HANDLING IN RELATION TO AN EPS PACKET DOMAIN

PRIORITY DATA

This application is a continuation of U.S. application Ser. No. 13/120,970 filed on Mar. 25, 2011, now U.S. Pat. No. 8,787,311, which is a National Stage Entry of PCT/EP2009/005748 filed on Aug. 7, 20009 which claims the benefit of U.S. Provisional Application No. 61/101,016, filed Sep. 29, 2008, the disclosure of which is fully incorporated herein by reference.

TECHNICAL FIELD

The present disclosure generally relates to the handling of AT commands. In particular, a technique for facilitating the use of AT commands specified for a General Packet Radio Service (GPRS) packet domain in relation to an Evolved Packet System (EPS) packet domain is disclosed.

BACKGROUND

Modern Universal Mobile Telecommunications System (UMTS) chip sets often support two or more different Radio Access Technologies (RATs) such as GPRS, Enhanced Data rates for GSM Evolution (EDGE), Wide Band Code Division Multiple Access (WCDMA) and evolved High Speed Packet Access (eHSPA). Regardless of the RAT currently active, a multi-RAT UMTS ser Equipment (UE) is always connected to the same packet-switched domain, the GPRS packet domain, for packet switched services. The UE may thus always use the same principles for Internet Protocol (IP) bearer and connection management and allocation.

IP bearer and connection management and allocation in the GPRS packet domain is based on Packet Data Protocol (PDP) contexts and comprises functions for activating, deactivating and modifying bearers and connections as generally described in the Technical Specification (TS) 24.008 "Mobile Radio Interface Layer 3 Specification; Core Network Protocols; Stage 3" of the 3rd Generation Partnership Project (3GPP). A PDP context can be regarded as a data record of parameters that characterize a specific bearer and connection to the target Packet Data Network (PDN).

Multiple applications running on one UE may require multiple connections to one or more PDN5, so that multiple PDP contexts may have to be defined. These multiple PDP contexts can be grouped into so-called primary PDP contexts (also referred to as non-secondary PDP contexts hereinafter) on the one hand and secondary PDP contexts on the other.

Multiple primary PDP contexts provide connections to different PDN5 and are each associated with a unique IP address. Each secondary PDP context is created based on an existing primary PDP context and provides a connection to the same PDN as this primary PDP context. However, the secondary PDP context is typically associated with a different Quality of Service (QoS) guarantee than the associated primary PDP context. Each primary and secondary PDP context has its own Radio Access Bearer (RAB) and is identified by a unique Network Layer Service Access Point Identifier (NSAPI) used both in the GPRS packet domain and locally by the UE.

Since the IP address is the same for the primary PDP context and its associated secondary PDP contexts, a Gateway GPRS Support Node (GGSN) in the GPRS packet domain requires a filter to route downlink user plane data into the correct RAB for the primary and secondary PDP contexts. This filter is set using a so-called Traffic Flow Template (TFT) communicated by the UE in the Activate Secondary PDP Context Request message to the GGSN.

In existing solutions the IP bearer and connection management and allocation scheme as defined in the 3GPP specifications for the link between the GPRS packet domain and the layer 3 functionalities of the UE is also used towards applications that utilize these layer 3 functionalities for data transfer. Such applications can either be installed internally in the UE or externally on a terminal device to which the UE provides modem services.

The IP bearer and connection management and allocation functionality can be provided towards the applications (and the terminal device) using an Application Programming Interface (API). For internal applications, the API may be realized in the form of a so-called Open Platform API (OPA) as described in A. Ghosh et al., "Open application environments in mobile devices: Focus on JME and Ericsson Mobile Platforms", Ericsson Review, Volume 82, 2005. Alternatively (e.g., for external applications), the IP bearer and connection management and allocation functionality may be provided through an AT command API in accordance with 3GPP TS 27.007 "AT command set for User Equipments (UE)".

As illustrated in FIG. 1, AT commands are used for controlling Mobile Termination (MT) functions as well as services in the GPRS packet domain from a Terminal Equipment (TE) through a Terminal Adapter (TA). TA, MT and TE may be implemented in the form of separate or integrated entities as needed. 3GPP TS 27.007 defines a plurality of AT commands for controlling MT functions and GPRS packet domain services based on PDP contexts. Each AT command includes a Context Identification (CID) parameter as reference to the specific PDP context (and the associated RAB) to which the AT command applies.

With Release 8 of the 3GPP specifications, the Long Term Evolution (LTE) RAT and the Evolved Packet System (EPS) are introduced. The EPS is the packet domain that will be used by a UE in the LTE mode instead of the conventional GPRS packet domain.

The GPRS packet domain and the EPS packet domain differ in many aspects. For example, instead of relying on PDP contexts, the EPS is based on a Non-Access Stratum (NAS) protocol that defines default bearers, dedicated bearers and Service Data Flows (SDFs, also called ESP bearer resources) as described in 3GPP TS 23.401 "GPRS enhancements for E-UTRAN access" and 3GPP TS 24.301 "Non-Access Stratum (NAS) protocol for Evolved Packet System (EPS); Core Network Protocols; Stage 3". Moreover, EPS bearer setup procedures are always triggered by the network side, whereas in the GPRS packet domain the UE initiates PDP context setup.

In the EPS, a bearer is the basic level of QoS control granularity (which means that all data traffic on the same EPS bearer is granted the same QoS guarantee and that different QoS guarantees may be provided for different bearers). An EPS default bearer is set up according to a defaults QoS profile in the process of initial UE network attachment. As a result, each UE has at least one active (default) bearer to speed up service initiation. Additional EPS bearers connected to the same PDN like the default bearer are called dedicated bearers and will typically have a different QoS profile than the associated default bearer.

The EPS SDF feature has similarities with the GPRS TFT feature in that each SDF can be regarded as being associated with a packet filter or packet filter aggregate (e.g., multiple uplink and downlink packet filters). Additionally, each SDF is associated with a specific QoS profile. An SDF is based on an EPS bearer, and several SDFs with the same QoS profile may build an aggregated SDF mapped to a single EPS bearer.

Contrary to GPRS, where the decision how to map TFTs and PDP contexts is performed in the UE, in the EPS the network decides how the mapping will be performed. As a result, an LTE Resource Allocation Request message for an SDF issued by an UE via NAS signalling can either return a new EPS dedicated bearer with the requested SDF or an already existing EPS (dedicated or default) bearer with an additional SDF. In the GPRS packet domain, the corresponding Secondary PDP Context Activate Request message would always return a new (secondary) PDP context with an associated RAB.

There generally exist several possibilities how to create an interface towards applications for IP bearer and connection management and allocation in the EPS. A first solution could re-use the concept as specified in 3GPP TS 24.301 for the interface between the UE layer 3 functionalities and the EPS also as a basis for the interface towards the applications residing on the UE or on a terminal device to which the UE is connected. Such an interface towards the applications would comprise EPS specific messages like Bearer Resource Allocation/Release Request messages, Activate Default/Dedicated EPS Bearer Context Request messages, and so on.

While this solution would work for a single-RAT UE providing only LTE support, it would be disadvantageous for an LTE-enabled multi-RAT UE that connects to the EPS packet domain for LTE bearers and to the GPRS packet domain for legacy UMTS bearers. Specifically, such a solution would require that the interface towards the applications for IP bearer and connection management and allocation would be different dependent on the active RAT. It would, however, in many cases be desirable that the applications can request packet-based services independently of the active RAT (i.e., that the applications can remain agnostic of the RAT currently in use).

A second interference solution could be the programming of a dedicated interface capable of interpreting PDP contexts as EPS bearers and vice versa. According to the second solution, a primary PDP context could be interpreted to correspond to an EPS default bearer, and a secondary PDP context could be interpreted to correspond to an EPS dedicated bearer. As a result, the AT command interface for LTE bearer control could re-use an existing AT command interface for GPRS packet domain control to a large extent.

The main drawbacks of the second solution are the different bearer activation approaches discussed above. That is, for GPRS packet domain bearers the UE decides whether a new PDP context shall be activated, whereas for the EPS packet domain it is the network that decides about the activation of a new EPS bearer. As a result, certain AT commands such as the PDP context/EPS bearer activation request (+CGACT) would have to be interpreted differently dependent on the active RAT. Consequently, additional logic will need to be implemented on the application side to handle the differences between the LTE RAT on the one hand and the legacy UMTS RATs on the other. This also implies that applications programmed for the GPRS packet domain might need to be updated to support the EPS packet domain.

SUMMARY

There is a need for an efficient technique that allows to overcome at least some of the problems described above. Specifically, a technique is needed that facilitates the use of AT commands specified for the GPRS packet domain in relation to the EPS packet domain.

According to a first aspect, the use of AT commands specified for the GPRS packet domain is facilitated in relation to the EPS packet domain by a method comprising the step of defining, in response to an AT command directed to the definition of a secondary PDP context, an EPS SDF on the basis of the secondary PDP context.

A request for a secondary PDP context may thus be translated to a request for an EPS SDF taking into account the requested secondary PDP context parameters (relating, for example, to a specific packet filter and/or QoS profile). Such an approach permits the re-use of many existing AT commands for EPS packet domain control without necessarily re-programming existing applications. It should be noted that the term "EPS SDF" as used in earlier versions of the 3GPP specifications has repeatedly changed in later versions to terms such as "EPS traffic flow" and "EPS bearer resource". Accordingly, it is intended that the term "EPS SDF" as used herein also covers the corresponding concept of the current version of the 3GPP specifications such as TS 24.301.

The newly defined EPS SDF request may be communicated via NAS signalling to the EPS packet domain and return a new EPS dedicated bearer with the requested SDF or an already existing EPS bearer associated with this SDF. The SDF may thus be defined within an existing PDN connection. As used herein, the term "EPS bearer" refers to both EPS default bearers and EPS dedicated bearers. In the same manner, the term "PDP context" refers to both non-secondary (i.e., primary) contexts and secondary PDP contexts.

Some or all of the AT commands may each include a CID parameter as a reference to a secondary or non-secondary PDP context. In the scenario of an AT command directed to the definition of a secondary PDP context, the CID parameter included in this AT command may be used as reference to the SDF thus defined.

The newly defined SDF may be associated with an EPS default bearer having a specific PDN connection. The EPS default bearer may, in turn, be associated with a dedicated CID parameter, and this CID parameter of the EPS default bearer may be associated with the CID parameter of the newly defined SDF to link the newly defined SDF to the associated EPS default bearer and/or the PDN connection.

The method may further comprise the step of defining, in response to an AT command directed to the definition of a non-secondary PDP context, an EPS default bearer on the basis of the non-secondary PDP context. The definition of the EPS default bearer may be performed taking into account parameters of the non-secondary PDP context.

The AT command directed to the definition of the non-secondary PDP context may include a CID parameter, and this CID parameter may be used as reference to the newly defined EPS default bearer.

In an implementation in which dedicated AT commands are defined to allow for the definition of secondary as well as non-secondary PDP contexts, the CID parameters in the respective AT commands may be used as references for both SDFs and EPS default bearers, respectively (instead of, for example, as references to EPS dedicated bearers and EPS default bearers). An EPS default bearer referenced by a CID may be associated with "match all" uplink and downlink packet filters (e.g., instead of SDF-defined packet filters). Moreover, in case a CID parameter is used as reference to an EPS default bearer, this CID parameter may in particular be used as reference to a default service or connection on this EPS default bearer. Additionally, or in the alternative, this CID parameter may be used as reference to the PDN connection associated with this EPS default bearer.

A mechanism for defining an EPS dedicated bearer may be provided also. In one implementation, the EPS dedicated bearer may be defined in response to an AT command including a CID parameter. The CID parameter included in the AT command may then be used as a reference to the newly defined EPS dedicated bearer.

In an exemplary scenario, an EPS bearer and one or more SDFs on the EPS bearer have been established with respect to a specific PDN. In this scenario, the EPS bearer and the one or more SDFs on the EPS bearer may be referenced by dedicated (i.e., different) CIDs.

The techniques presented herein may be performed by a multi-RAT (or multi-mode) user terminal supporting the LTE RAT and one or more legacy UMTS RATs. In a legacy UMTS (including, e.g., GPRS and EDGE) mode, each AT command may be interpreted in a manner as specified for the GPRS packet domain in the legacy specifications (of, e.g., 3GPP Release 7 and earlier).

The multi-RAT user terminal may be capable of performing a handover (including a RAT change, or internal RAT handover) between LTE network access and legacy UMTS network access. In a typically handover scenario from LTE network access to legacy UMTS network access, n PDP contexts may have been defined, and n SDFs may have been associated with one EPS bearer in the EPS packet domain before the handover. After the handover to legacy UMTS network access, the n PDP contexts may be mapped on one PDP context towards the GPRS packet domain.

For compatibility reasons, a conversion logic between GPRS QoS profiles and EPS QoS profiles may be provided. Using the conversion logic, a GPRS QoS profile may be translated into an EPS QoS profile, and vice versa. The GPRS QoS profile may be compliant with a 3GPP release 7 or earlier QoS profile, and the EPS QoS profile may be compliant with a 3GPP release 8 or later QoS profile. The conversion logic may be used for an AT command specifying a QoS profile, such as for any of the +CGEQREQ, +CGEQMIN, +CGEQOS, and +CGEQOSRDP AT commands. In one implementation, these AT commands are applied to an SDF in case of LTE network access and to a PDP context in case of legacy UMTS network access.

As another measure, support for one or more further AT commands such as +CGTFT, +CGCMOD and +CGACT may be provided. These further AT commands may be applied to SDFs and/or EPS bearers in the case of LTE network access, and to PDP contexts in the case of legacy UMTS (e.g., WCDMA) network access.

+CGACT support may comprise sending a message relating to an activation of a bearer resource (e.g., a Bearer Resource Allocation Request message) upon activation of the EPS SDF or sending a message relating to a release of a bearer resource (e.g., a Bearer Resource Release Modification Request message) upon deactivation of the EPS SDF. Moreover, in the context of the +CGACT AT command a PDN connectivity request message may be sent upon activation of the EPS default bearer, or a PDN disconnect request message may be sent upon deactivation of the EPS default bearer.

The AT command may be requested by, triggered by or received from an application or via a user interface. The application may be executed locally within the UE or by an external terminal device to which the UE provides modem services. In one implementation, the application is agnostic of whether a connection to the GPRS packet domain or the EPS packet domain exists. In other words, the application is not aware of the RAT currently active.

The application may be limited to initiate setup at least one of one or more EPS bearers and one or more SDFs (e.g., based on the AT commands directed to the definition of non-secondary and secondary PDP contexts such as +CGDCONT and +CGDSONT, respectively). This may imply that using the "conventional" AT commands specified for the GPRS packet domain, only EPS default bearers and SDFs will be established. As regards the setup of an EPS dedicated bearer, additional control mechanisms may be provided if desired. For example, EPS dedicated bearers may be handled non-transparently for or by the application, so that the application may specifically request setup of an EPS dedicated bearer if desired. As an example, a new AT command may be defined explicitly for this purpose.

The techniques presented herein may be realized in the form of software, in the form of hardware, or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a hard disk and so on. Moreover, the computer program product may be provided for download via a network connection onto such a recording medium.

According to a further aspect, a device for facilitating the use of AT commands specified for a GPRS packet domain in relation to an EPS packet domain is provided. The device comprises a component adapted to define, in response to an AT command directed to the definition of a secondary PDP context, an EPS SDF on the basis of the secondary PDP context. The EPS SDF may be defined within an existing PDN connection.

The device may further comprise a component adapted to use a CID parameter included in the AT command and referencing the secondary PDP context as a reference to the EPS SDF. Additionally, a component adapted to define, in response to an AT command directed to the definition of a non-secondary PDP context, an EPS default bearer on the basis of the non-secondary PDP context may be provided. This component may be adapted to use a CID parameter included in the AT command and referencing the non-secondary PDP context as reference to the EPS default bearer. Still further, a component adapted to use the CID parameter included in the AT command as linkage to a PDN connection associated with the EPS default bearer may be comprised by the device.

Also provided is a user terminal (UE) comprising such a device. Possible implementations of the user terminal include mobile telephones, network cards, data cards or sticks, portable or stationary computers with network access capabilities, and so on.

BRIEF DESCRIPTION OF THE DRAWINGS

Further aspects and advantages of the technique presented herein will become apparent from the following description of preferred embodiments and the drawings, wherein:

FIG. 6 schematically illustrates a table visualizing packet domain identifiers in the EPS and GPRS packet domains.

DETAILED DESCRIPTION

In the following description of preferred embodiments, for purposes of explanation and not limitation, specific details are set forth (such as particular signal processing components and sequences of signal processing steps) in order to provide a thorough understanding of the present invention. It will be apparent to one skilled in the art that the technique described herein may be practised in our embodiments that depart from these specific details.

For example, while the following embodiments will primarily be described in the context of specific AT commands (such as in particular +CGDCONT and +CGDSCONT), the technique disclosed herein can also be applied to other AT commands specified by 3GPP. Further, the present technique is not restricted to AT commands as defined in the 3GPP specifications. For example, the technique could also be applied to commands defined for open platform solutions based on the OPA or any other API for EPS/GPRS bearer management. Moreover, while the embodiments will relate to an exemplary LTE implementation, it will be readily apparent that the technique described herein may also be implemented in other communications networks such as LTE-Advanced networks.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purpose computer. It will also be appreciated that while the following embodiments will primarily be described in the context of methods and devices, the invention may also be embodied in a computer program product as well as in a system comprising a computer processor and a memory coupled to the processor, wherein the memory is encoded with one or more programs that may perform the services, functions and steps disclosed herein.

Figure 2:
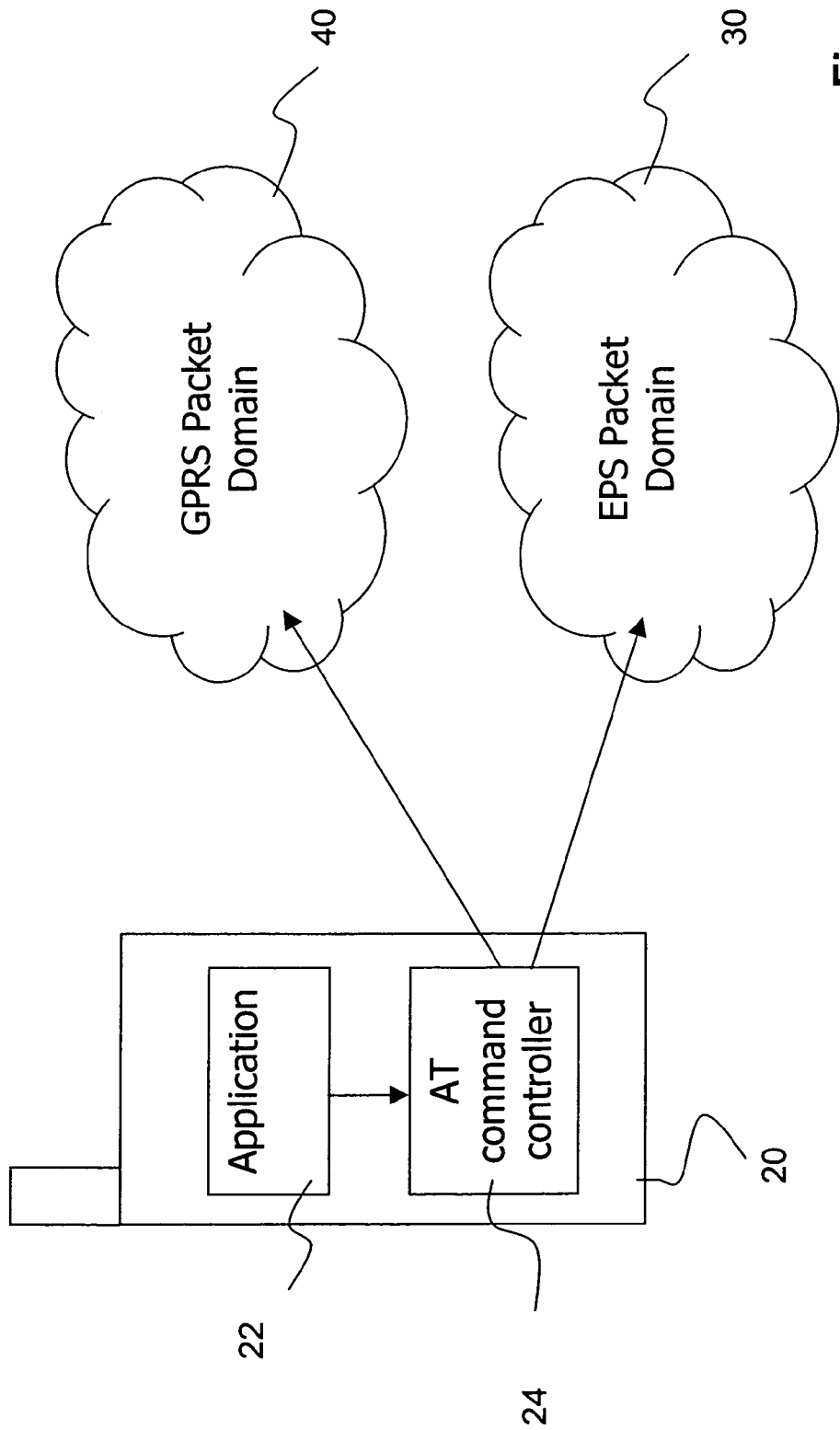
FIG. 2 schematically illustrates an embodiment of a multi-RAT user terminal.

FIG. 2 shows an embodiment of a user terminal (UE) 20 comprising one or multiple applications 22 as well as an AT command controller 24 configured to provide network access functionalities to the application 22 on the basis of AT command signalling. The UE 20 is configured to support network access via multiple RATs, including at least LTE network access and WCDMA or eHSPA network access. As illustrated in FIG. 2, the application 22 may thus be served either in the EPS packet domain 30 (LTE network access) or in the GPRS packet domain 40 (WCDMA/eHSPA network access). The UE 20 is further configured to support inter-RAT (IRAT) handover, e.g., from WCDMA or eHSPA to LTE and vice versa.

It should be noted that in alternative embodiments, the application 22 may be an external application running on a terminal device such as a mobile or stationary computer. In the case of an external implementation, the UE 20 is configured to provide modem services to the terminal device.

Figure 1:
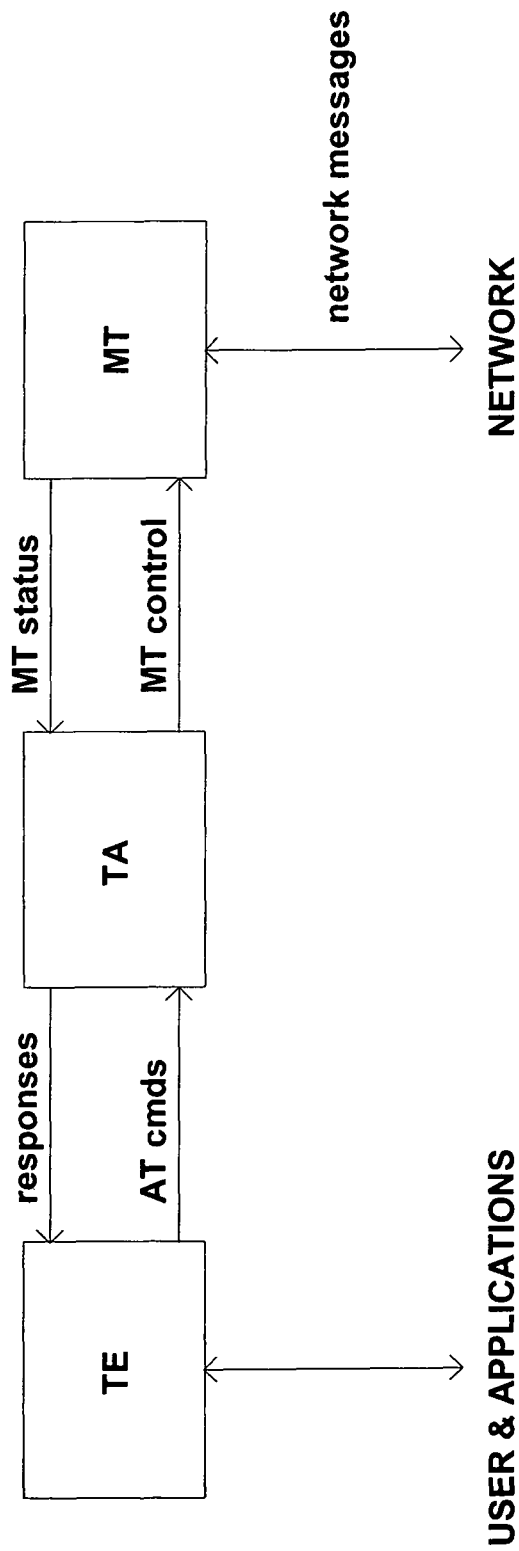
FIG. 1 schematically illustrates an exemplary implementation of the functional entities coupled between applications or user interfaces on the one side and a packet-based network on the other side.
Figure 3:
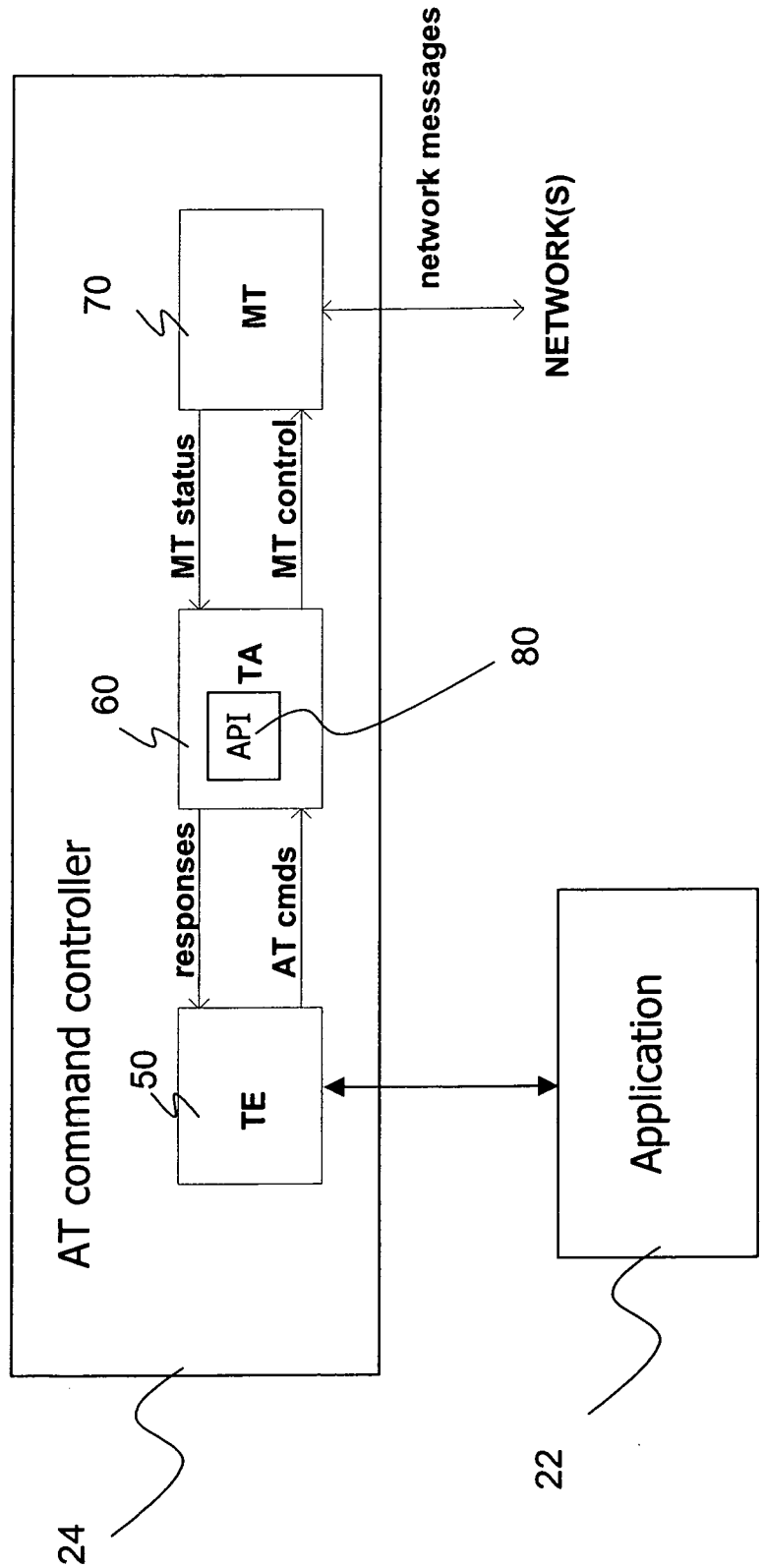
FIG. 3 schematically illustrates an embodiment of an AT command controller of the user terminal of FIG. 2.

FIG. 3 illustrates the configuration of the AT command controller 24 of the UE 20. As becomes apparent from FIG. 3, the AT command controller 24 generally comprises the functional entities already discussed above with reference to FIG. 1. That is, the AT command controller 24 comprises a Terminal Equipment, or TE, 50 configured to be coupled the application 22, a Terminal Adapter, or TA, 60 coupled to the TE 50 as well as a Mobile Termination, or MT, 70 coupled to the TA 60.

The TE 50 communicates with the TA 60 via AT commands and receives corresponding responses. For communicating with the TE 50, the TA 60 comprises an AT command interface 80 in the form of an API. The TA 60 communicates with the MT 70 via MT control and status messages as generally illustrated in FIG. 3. The MT 70 provides network access functionalities to, for example, the EPS packet domain 30 and the GPRS packet domain 40 illustrated in FIG. 2. To this end, the MT 70 transmits and receives network messages via the active RAT.

Figure 4:
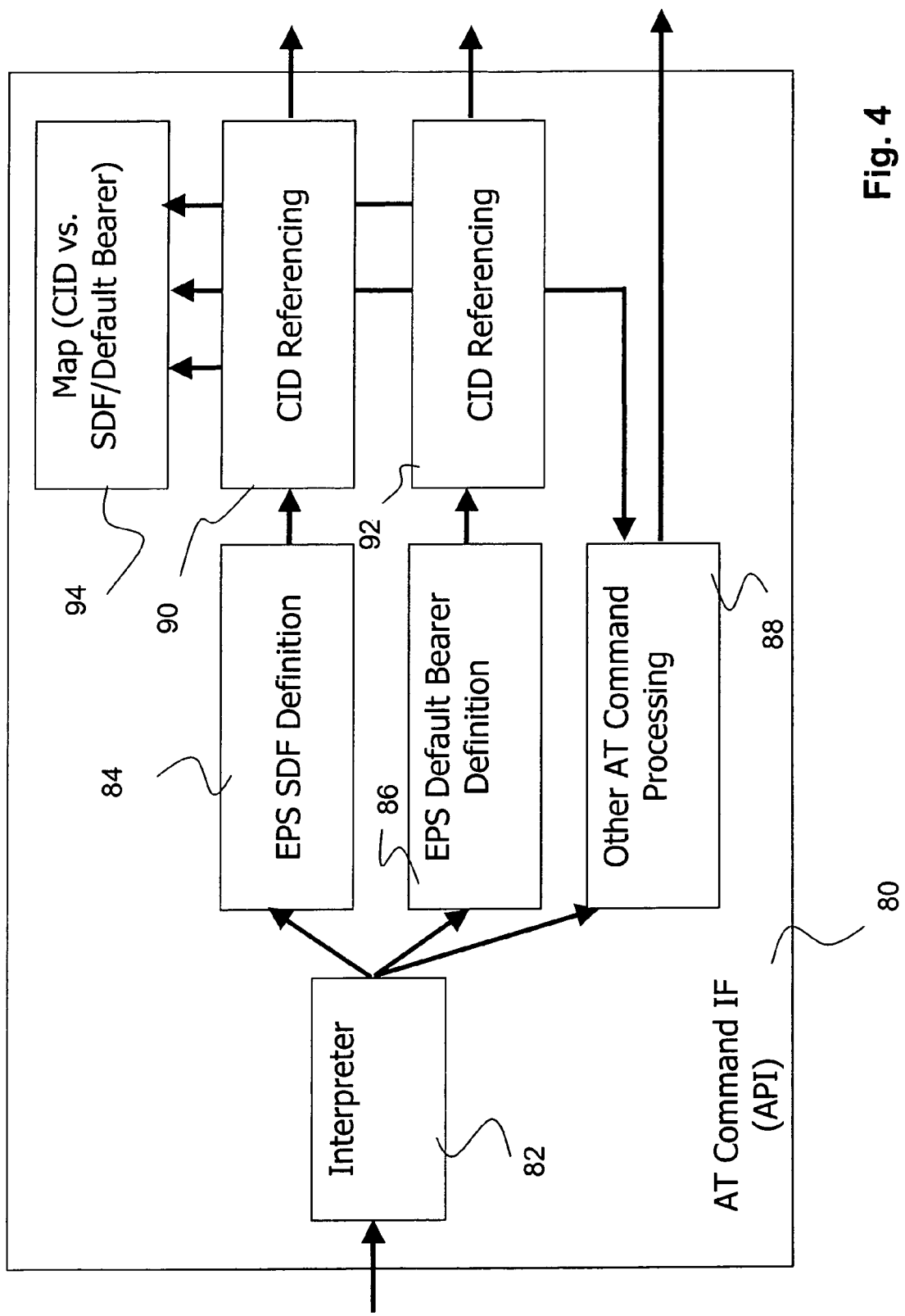
FIG. 4 schematically illustrates an embodiment of an Application Programming Interface of the controller of FIG. 3.

The internal configuration of the AT command interface 80 of the TA 60 is shown in FIG. 4. As illustrated in FIG. 4, the AT command interface 80 comprises an AT command interpreter 82, an EPS SDF definition component 84, an EPS default bearer definition component 86 and a component 88 for processing other AT commands. Additionally, a dedicated CID referencing component 90, 92 is coupled to each of the EPS SDF definition component 84 and the EPS default bearer definition component 86 as shown in FIG. 4. Both CID referencing components 90, 92 are coupled to a storage 94 configured to store a map correlating CID parameters with SDFs and EPS default bearers. The map may additionally hold the CID parameters for EPS dedicated bearers. In one realization, the map has the form of a table with a first table row listing the individual CID parameters and an associated second table row listing the individual identifiers of SDFs, default bearers and, optionally, dedicated bearers.

The operation of the AT command interface 80 illustrated in FIG. 4 will now be described with reference to an exemplary method embodiment illustrated in the flow diagram 500 of FIG. 5.

In a first step 502, the interpreter 82 receives an AT command from the TE 50. The AT command may have been received by the TE 50 from the application 22 or may have been generated by the TE 50 upon a request received from the application 22 or a user interface (not shown). In the present embodiment it is assumed that the received AT command is either the +CGDCONT AT command directed to the definition of a (primary) PDP context or the +CGDSCONT AT command directed to the definition of a secondary PDP context. In each case the AT command will comprise a CID parameter as well as PDP context definition parameters indicative of, for example, a packet data protocol type (such as IP or X.25).

In the case the AT command is directed to the definition of a primary PDP context, the next processing step 502 will be performed by the EPS default bearer definition component 86. Otherwise, i.e., if the AT command is directed to the definition of a secondary PDP context, the further processing will be performed by the EPS SDF definition component 84. In the case that the received AT command is neither the +CGDCONT AT command nor the +CGDSCONT AT command (a case which is not specifically considered further in the context of FIG. 5), the further processing is performed by the processing component 88.

In the following, the processing chain in FIG. 5 for +CGDCONT processing will be discussed first. In step 504 an EPS default bearer is defined based on the primary PDP context definition received via the AT command. As there is always one EPS default bearer per PDN connection, the primary PDP context will also specify the PDN connection which belongs to the EPS default bearer. As mentioned above, each PDN connection has its own IP address.

In the received +CGDCONT AT command, the primary context defined therein is associated with the specific CID parameter also included in this AT command. The primary PDP context defined for this CID parameter will not include all services on the EPS default bearer as it will be used only as reference to the specific default service/default connection on this EPS default bearer associated with the "match all" uplink and downlink packet filters (i.e., as reference to the default service/default connection for which no dedicated packet filters have been defined in accordance with, for example, an SDF). This means that the primary PDP context defined for the specific CID parameter (as well as the specific CID parameter itself) will not be used as reference to any (other) SDFs on the particular EPS default bearer, as these SDFs may be referenced by other CID parameters as will be discussed in more detail below.

After the EPS default bearer definition step 504, the operation of the AT command interface 80 proceeds with referencing the newly defined EPS default bearer by the specific CID parameter included in the corresponding +CGDCONT AT command by CID referencing component 92 (step 506). To this end, the specific CID parameter is entered together with an identifier of the newly defined EPS default bearer (corresponding, for example, to the NSAPI in a GPRS packet domain scenario) in the table maintained in the storage 94.

In a next step 508, a request for activating the newly defined EPS default bearer is generated. Step 508 may be performed by the AT command processing component 88 in response to receipt of a +CGACT AT command by interpreter 82. To identify the EPS default bearer that needs to be activated, the AT command processing component 88 may determine the CID parameter included in the +CGACT AT command and retrieve the associated EPS default bearer identifier from the storage 94 as illustrated by an arrow in FIG. 4. Still in step 508, the AT command processing component 88 may generate a PDN connectivity request for the specific EPS default bearer and transfer the request via MT control signalling to the MT 70 of FIG. 3. The MT 70 of FIG. 3 will then forward this request via a corresponding network message to the EPS packet domain 30.

Figure 5:
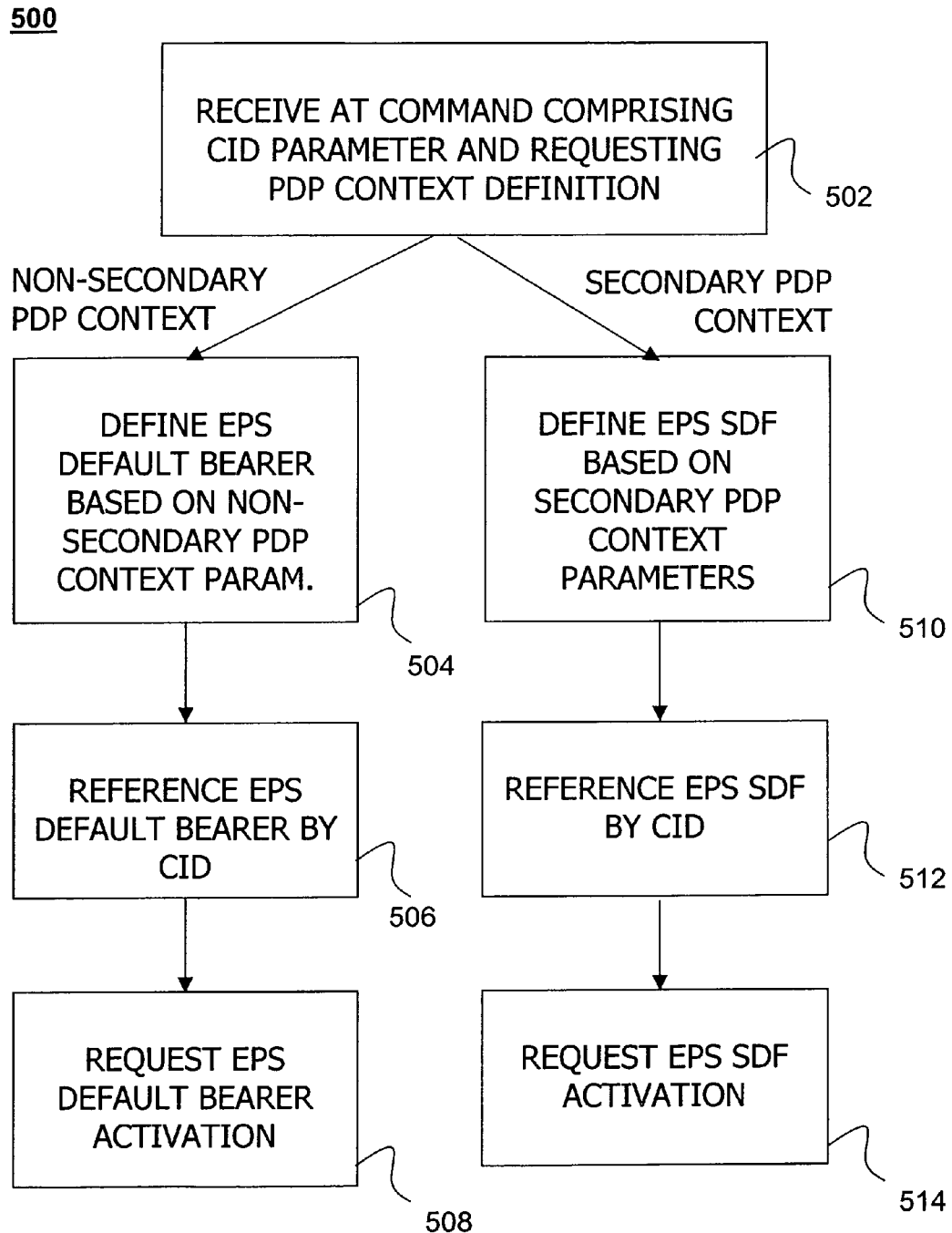
FIG. 5 shows a flow diagram according to a method embodiment.

Now, the second processing branch of the flow diagram 500 illustrated in FIG. 5 will be considered in more detail. The second processing branch starts in step 510 with the definition of an EPS SDF based on the secondary PDP context parameters included in the +CGDSCONT AT message received in step 502. Step 510 is carried out by the EPS SDF definition component 84 which defines, based on the secondary PDP context received with the +CGDSCONT AT command, a new EPS SDF within an existing PDN connection. This means that the newly defined SDF is based on the same IP protocol settings as the EPS default bearer associated with the newly defined SDF. The application 22 is not made aware of whether the newly defined SDF will be set up on a new EPS dedicated bearer, on an already existing EPS dedicated bearer, or on the associated EPS default bearer. The newly defined SDF will be linked to the specific PDN connection by specifying the CID parameter of the associated EPS default bearer (e.g., in the storage 94).

Once the EPS SDF has been defined in step 510, the operation of the AT command interface 80 proceeds with step 512. In step 512, the newly defined EPS SDF is referenced by the CID parameter also transported in the +CGDSCONT AT command that included the secondary PDP context defining the EPS SDF. To this end, the CID referencing component 90 generates a new entry in the table in storage 94. This new entry associates the CID parameter with an identifier of the newly generated SDF. Additionally, the table entry may include the CID parameter of the EPS default bearer underlying the newly defined SDF.

In a further step 514, a request for activating the newly defined SDF is generated. As has already been discussed above with reference to step 508, the activation request for the SDF can be generated in response to receipt of a +CGACT AT command requesting activation of the specific secondary PDP context. The AT command processing component 88 will then in a first step determine the CID parameter included in this +CGACT AT command, retrieve the associated SDF identifier (and, optionally, the corresponding identifier of the associated EPS default bearer) from the table in storage 94, and generate a Bearer Resource Allocation Request or similar message to be sent via the MT 70 to the EPS packet domain 30.

As has become apparent from the above, various identifiers will be defined, read and processed by the AT command interface 80 during its operation. All these identifiers may be stored in a table (or any other data structure) in the storage 94. Generally, the identifiers towards the network (GPRS packet domain or EPS packet domain) will differ from the identifiers used towards the application 22. A table 600 in FIG. 6 illustrates the relationship between the identifiers towards the network and the identifiers towards the application 22 for the GPRS packet domain and the EPS packet domain, respectively.

The information held in storage 94 may also be used in the context of a handover or RAT change (e.g., from a WCDMA network access to an LTE network access, or vice versa). The general aim is that the AT command interface 80 should require no adaptation towards the application 22 in the case of a handover or RAT change. In other words, it is desired that the application 20 can remain agnostic of the specific RAT currently active.

On both sides of the AT command interface 80, i.e., towards the network and towards the application 22, in a legacy UMTS (including, e.g., WCDMA, GPRS or EDGE) mode PDP contexts are used for IP bearer and connection management and allocation. For this reason, there is a one-to-one relation between CID parameters and NSAPI parameters in conventional interface solutions. This one-to-one relation on both sides of the AT command interface 80 has to be changed in order to handle the handover from LTE network access to legacy UMTS network access such that there is a one-to-n relation between PDP contexts towards the network (identified by NSAPI parameters) and PDP contexts towards the application 22 (identified by CID parameters).

This one-to-n relation means that if there are n SDFs mapped to one EPS bearer before the handover or RAT change, there will be n PDP contexts on the interface towards the application 22 which are mapped to one PDP context on the interface towards the network (i.e., towards the GPRS packet domain after handover or RAT change). This mapping may be performed by a dedicated component (not shown) of the AT command interface 80 based on table entries in the storage 94.

Until now, the description of the embodiments was focussed on the +CGDCONT and the +CGDSCONT AT commands and on some aspects of the +CGACT AT command. In the following, the operation of the AT command interface 80 and, more specifically, of its AT command processing component 88 for other legacy AT commands supported by the AT command controller 24 will be described.

First, the AT command controller 24 may support the +CGEQREQ AT command. This command allows the TE 50

(and the application 22) to specify a QoS profile which is used when the UE 20 intends to allocate bearer resources (e.g., by sending a Bearer Resource Allocation Request message to the network). In the EPS packet domain scenario, the command specifies a QoS profile for the SDF identified by the CID parameter included in the command. For backwards compatibility, the command itself specifies the QoS profile in compliance with Release 7 of the 3GPP specifications. Therefore, in order to implement the requested QoS profile in the EPS packet domain, the AT command interface may implement a conversion logic which converts the requested 3GPP release 7 QoS profile into a 3GPP Release 8 QoS profile for the EPS packet domain.

The AT command interface 80 may further support the +CGEQMIN AT command. This command allows the TE 50 and the application 22 to specify a minimum acceptable QoS profile which is checked by the UE 20 against the negotiated QoS profile as returned, for example, in an Activate Dedicated Bearer Context Request or Modify EPS Bearer Context Request message. The command specifies a QoS profile for the SDF identified by the CID included in the command. For backwards compatibility, the QoS profile itself is specified in compliance with Release 7 of 3GPP. Therefore, in order to use the requested 3GPP Release 7 QoS profile in the EPS packet domain, the AT command interface 80 has to implement a conversion logic which converts the requested 3GPP Release 7 QoS profile into a 3GPP release 8 QoS profile for the EPS packet domain.

A still further AT command supported by the AT command interface 80 may be +CGEQNEG. This command allows the TE 50 and the application 22 to retrieve the negotiated QoS profile per SDF (as identified by the CID parameter included in the AT command) returned to an Active Dedicated Bearer Context Request or Modify EPS Bearer Context Request message. Despite having only one QoS definition per EPS bearer in the network (and not per SDF), the AT commands for QoS profile definition may be reused for the EPS packet domain. Therefore, on the UE side, an extension may be provided that allows storing (e.g., in the storage 94) of the negotiated QoS profile returned per SDF. It should be noted that for the GPRS packet domain, the QoS profile has to be stored per PDP context only, as one CID parameter refers exactly to one PDP context. It should also be noted that the negotiated QoS profile in an LTE system is expected to be the same for all SDFs on the same EPS bearer.

The interface 80 may further support the +CGTFT AT command. This command enables the application 22 to define at least one packet filter which is assigned to an SDF. The SDF itself may relate to an aggregate of one or several packet filters. In an LTE system, the one or more packet filters (corresponding to a TFT in legacy UMTS system) are defined for a PDN connection and define the rules how to route packets into the EPS dedicated bearers available within the PDN connection. In a present case it will not matter that the CID parameters do not identify EPS dedicated bearers, but SDFs instead. In the GPRS packet domain, the +CGTFT AT command requires keeping track of all packet filters which have been defined for a given IP address. In this context, the packet filter identifiers must be unique over all CID parameters associated with the CID parameter of the primary PDP context. Since packet filter definitions can be performed for any CID parameter, but need to be tracked across all secondary PDP context within a PDN connection, it will not cause any problems if CID parameters are used to designate SDFs in an LTE system. However, it is still necessary to keep track of the packet filter identifiers to make sure that all packet filter identifiers are unique across all SDFs belonging to one PDN connection.

As has already been briefly mentioned above, the AT command interface 80 also supports the +CGACT AT command. This "execution" command is used to activate or deactivate EPS bearers and/or SDFs. The EPS bearers and SDFs are specified in the +CGACT AT command by their respective CID parameter. In addition to the use cases for activating an EPS default bearer or an SDF discussed above with reference to FIG. 5, deactivation scenarios can also be implemented. In the case, for example, that an EPS default bearer is requested to be deactivated, a PDN disconnect request may be sent to the network. If, on the other hand, an SDF is requested to be deactivated, a corresponding release message (such as a Bearer Resource Release Request message) will be sent to the network.

Still further, the AT command interface 80 may also support the +CGCMOD AT command. This command is used to modify the SDF specified by a particular CID parameter in the command. The modification may in particular relate to QoS profiles and packet filters. For each SDF to be modified a corresponding modification message (such as a Bearer Resource Allocation Request message) will be sent to the network.

The AT commands discussed above are basically legacy AT commands that have already been defined for the GPRS packet domain and can be re-used for the EPS packet domain. In the following, modifications to existing AT commands as well as the introduction of new AT commands specifically tailored to the needs of the EPS packet domain will be discussed.

As the parameters of the 3GPP Release 8 QoS profiles are different from the parameters of the 3GPP Release 7 QoS profiles, new AT commands for the requested LTE QoS profile, the minimum LTE QoS profile and the negotiated LTE QoS profile could be introduced. There exist basically two ways how to include those new AT commands in the existing command set.

The first option is a replacement of the corresponding 3GPP Release 7 QoS profile AT commands with the new AT commands. In other words, the new commands would replace the old commands for both a LTE single-RAT UE as well as for a multi-RAT UE supporting, for example, LTE network access and WCDMA network access. Therefore, the multi-RAT UE has to provide a conversion logic which converts a requested 3GPP Release 8 QoS profile into a 3GPP Release 7 QoS profile in case WCDMA is the active RAT.

A second option would be the coexistence of the new AT commands with the existing AT commands. In case an application defines or requests a QoS profile via the existing AT command, the UE requires a conversion logic which converts the 3GPP Release 7 AT command into a 3GPP Release 8 AT command when LTE is the active RAT. The conversion has to be performed in the other direction in the case an application defines or requests a QoS profile via the newly introduced AT command while WCDMA or another legacy UMTS (including, e.g., WCDMA, GPRS and EDGE) RAT is active. In case an application defines or requests two QoS profile versions according to the conventional AT command and the newly defined AT command, the UE may use the parameters of the conventional AT command for legacy UMTS (including, e.g., GPRS and EDGE) network access and the parameters of the newly defined AT command for LTE network access.

It has further been found that the current AT command sets does not support the removal of a packet filter for an SDF, which could be useful in particular for LTE services. There are basically the following possibilities to introduce the new functionality. First, the +CGTFT AT command could be extended. For example, specific extensions of the +CGTFT AT command could be defined that cause one or more packet filters identified in the command to be released from a specific SDF also identified in the command (e.g., by the associated CID parameter). According to a further option, a new AT command for packet filter removal may be introduced. This command may comprise parameters for identifying the one or more packet filters to be removed as well as a further parameter (such as the CID parameter) identifying the specific SDF to which the command applies.

As has become apparent from the above embodiments, the technique presented herein has various advantageous effects. For example, the technique allows the provision of a common interface towards applications for IP bearer and connection management and allocation that is independent of the RAT currently active (such as GPRS, EDGE, WCDMA, eHSPA and LTE). As a result, EPS packet domain services can be provided to existing applications and user interfaces without requiring any adaptation. In particular, GPRS packet domain-compliant applications can profit from EPS packet domain services without having to adapt the applications.

It is believed that many advantages of the technique disclosed herein will be fully understood from the foregoing description, and it will be apparent that various changes may be made in the form, construction and arrangement of the exemplary embodiments without departing from the scope of the invention, or without sacrificing all of its advantages. Because the technique presented herein can be varied in many ways, it will be recognized that the invention should be limited only by the scope of the claims that follow.

The invention claimed is:

1. A user terminal, capable of accessing both a General Packet Radio Service (GPRS) packet domain and an Evolved Packet System (EPS) packet domain, and further capable of executing applications that use Internet Protocol (IP) bearers, the applications using AT commands for controlling the IP bearers, the user terminal further comprising:
   at least one microprocessor;
   a non-transitory computer readable storage medium, coupled to the at least one microprocessor, further including computer-readable instructions, when executed by the at least one microprocessor, are configured to
      define, in response to an AT command directed to a definition of a secondary Packet Data Protocol (PDP) context type of IP bearer in the GPRS domain, an EPS Service Data Flow (SDF) type of IP bearer in the EPS domain on the basis of the secondary PDP context.

2. The user terminal of claim 1, wherein the EPS SDF is defined within an existing Packet Data Network (PDN) connection.

3. The user terminal of claim 1, wherein each AT command includes a Context Identification (CID) parameter as reference to the PDP context.

4. The user terminal of claim 3, wherein the computer-readable instructions are further configured to:
   use the CID parameter included in the AT command as reference to the EPS SDF.

5. The user terminal of claim 3, wherein the computer-readable instructions are further configured to:
   use the CID parameter of an EPS default bearer associated with the EPS SDF to link the EPS SDF to a Packet Data Network (PDN) connection associated with the EPS default bearer.

6. The user terminal of claim 1, wherein the computer-readable instructions are further configured to:
   define, in response to an AT command directed to the definition of a non-secondary PDP context, an EPS default bearer on the basis of the non-secondary PDP context.

7. The user terminal of claim 3, wherein the computer-readable instructions are further configured to:
   use the CID parameter included in the AT command as reference to an EPS default bearer.

8. The user terminal of claim 1, wherein the computer-readable instructions are further configured to:
   define an EPS dedicated bearer.

9. The user terminal of claim 8, wherein the computer-readable instructions are further configured to:
   define the EPS dedicated bearer in response to an AT command including a Context Identification (CID) parameter; and
   use the CID parameter included in the AT command as a reference to the EPS dedicated bearer.

10. The user terminal of claim 3, wherein an EPS bearer and one or more SDFs on the EPS bearer have been established, and wherein the EPS bearer and the one or more SDFs on the EPS bearer are referenced by dedicated CIDs.

11. The user terminal of claim 1, wherein user terminal operates in a Long Term Evolution (LTE) mode and the user terminal additionally supports a legacy Universal Mobile Telecommunications System (UMTS) mode.

12. The user terminal of claim 11, when the user terminal is operating in the legacy UMTS mode, the computer-readable instructions are further configured to:
   interpret each AT command in a manner specified for the GPRS packet domain.

13. The user terminal of claim 11, wherein the user terminal is capable of performing at least one of a handover and Radio Access Technology (RAT) change between LTE network access and legacy UMTS network access, and the computer-readable instructions are further configured to:
   map, in a handover scenario in which n PDP contexts have been defined and n EPS SDFs are associated with one EPS bearer in the EPS packet domain before the handover, the n PDP contexts on one PDP context towards the GPRS packet domain.

14. The user terminal of claim 1, wherein the computer-readable instructions are further configured to:
   provide a conversion between GPRS Quality of Service (QoS) profiles and EPS QoS profiles.

15. The user terminal of claim 14, wherein the GPRS QoS profiles are compliant with a 3GPP Release 7 or earlier QoS profile and the EPS QoS profiles are compliant with a 3GPP Release 8 or later QoS profile.

16. The user terminal of claim 14, wherein the conversion is provided in response to an AT command specifying a QoS profile.

17. The user terminal of claim 16, wherein the AT command is any of +CGEQREQ, +CGEQMIN, +CGEQOS and +CGEQOSRDP AT commands.

18. The user terminal of claim 1, wherein the computer-readable instructions are further configured to:
   provide support for at least one of +CGCMOD AT command and +CGTFT AT command.

19. The user terminal of claim 1, wherein the computer-readable instructions are further configured to:
   provide support for +CGACT AT command.

20. The user terminal of claim 19, wherein the computer-readable instructions are further configured to:

send a message relating to an activation of a bearer resource upon activation of the EPS SDF; or send a message relating to a release of a bearer resource upon deactivation of the EPS SDF.

21. The user terminal of claim 5, wherein the computer-readable instructions are further configured to:

send a PDN connectivity request message upon activation of the EPS default bearer; or send a PDN disconnect request message upon deactivation of the EPS default bearer.

22. The user terminal of claim 1, wherein the AT command is received from, requested by, or triggered by an application.

23. The user terminal of claim 22, wherein the application is agnostic of whether a to connection to the GPRS packet domain or the EPS packet domain exists.

24. The user terminal of claim 22, wherein the application is configured to dedicatedly handle EPS dedicated bearers.

* * * * *

UNITED STATES PATENT AND TRADEMARK OFFICE
CERTIFICATE OF CORRECTION

| | | |
|---|---|---|
| PATENT NO. | : 9,232,549 B2 | Page 1 of 1 |
| APPLICATION NO. | : 14/297750 | |
| DATED | : January 5, 2016 | |
| INVENTOR(S) | : Lerzer et al. | |

It is certified that error appears in the above-identified patent and that said Letters Patent is hereby corrected as shown below:

Specification

In Column 1, Line 10, delete "Aug. 7, 20009" and insert -- Aug. 7, 2009 --, therefor.

In Column 1, Line 47, delete "PDN5," and insert -- PDNs, --, therefor.

In Column 1, Line 53, delete "PDN5" and insert -- PDNs --, therefor.

In Column 2, Line 45, delete "ESP" and insert -- EPS --, therefor.

In Column 2, Line 57, delete "a defaults" and insert -- a default --, therefor.

In Column 10, Line 35, delete "application 20" and insert -- application 22 --, therefor.

Claims

In Column 15, Line 14, in Claim 23, delete "a to" and insert -- a --, therefor.

Signed and Sealed this
Twelfth Day of April, 2016

Michelle K. Lee
*Director of the United States Patent and Trademark Office*